US012598149B2

(12) United States Patent
Li

(10) Patent No.: US 12,598,149 B2
(45) Date of Patent: Apr. 7, 2026

(54) APPARATUS AND METHOD FOR POOLING NETWORK INTERFACE CARDS IN A CLOUD NETWORK

(71) Applicant: Lawrence Li, Beijing (CN)

(72) Inventor: Lawrence Li, Beijing (CN)

(73) Assignee: Lawrence Li, Beijing (CN)

( * ) Notice: Subject to any disclaimer, the term of this patent is extended or adjusted under 35 U.S.C. 154(b) by 0 days.

(21) Appl. No.: 18/198,197

(22) Filed: May 16, 2023

(65) Prior Publication Data

US 2024/0388544 A1     Nov. 21, 2024

(51) Int. Cl.
  *H04L 49/354*         (2022.01)
  *G06F 9/455*          (2018.01)
  *H04L 49/00*          (2022.01)
(52) U.S. Cl.
  CPC ........ *H04L 49/354* (2013.01); *G06F 9/45558* (2013.01); *H04L 49/70* (2013.01); *G06F 2009/45595* (2013.01)
(58) Field of Classification Search
  CPC ........................ H04L 49/70; G06F 2009/45595
  See application file for complete search history.

(56) References Cited

U.S. PATENT DOCUMENTS 7,733,890  B1 *   6/2010   Droux ................. H04L 49/9063
                                                370/412
11,743,189  B2 *   8/2023   Rosenberg .............. H04L 49/30

2008/0002739  A1 *   1/2008   Droux ................. H04L 41/0896
                                                370/468
2008/0043765  A1 *   2/2008   Belgaied ............. H04L 12/4679
                                                370/409
2008/0195756  A1 *   8/2008   Galles ................. G06F 9/45558
                                                709/245
2008/0288661  A1 *   11/2008   Galles ..................... G06F 13/10
                                                710/3
2011/0090910  A1 *   4/2011   Tripathi .................. H04L 49/90
                                                370/395.1
2012/0278599  A1 *   11/2012   Nilakantan ............. H04L 67/34
                                                713/2
2013/0156028  A1 *   6/2013   Hernandez .......... H04L 12/4641
                                                370/359
2013/0346531  A1 *   12/2013   Hummel ................. H04L 49/70
                                                370/254
2014/0003249  A1 *   1/2014   Cai ......................... H04L 43/10
                                                370/241

(Continued)

*Primary Examiner* — Madhu Woolcock

(57)          ABSTRACT

A network interface component having a CPU and a pool of physical NICs used to provide network interface resources for one or more virtual NICs is disclosed. An operating system of the network interface component creates one or more virtual NICs to facilitate data flows to and from virtual machines running on one or more servers coupled to the network interface component. The operating system dynamically creates and manages as many virtual NICs as is necessary to handle traffic flows to/from one or more virtual machines running on one or more servers coupled to the network interface component. The operating system also directs which of the physical NICs are to be used or shared amongst which of the virtual NICs. Any physical NIC from the pool can be shared by more than one virtual NIC and can also be reassigned to another virtual NIC depending on traffic flows through the cloud computing network.

21 Claims, 5 Drawing Sheets

(56)         References Cited

U.S. PATENT DOCUMENTS

| | | | |
|---|---|---|---|
| 2014/0108584 A1* | 4/2014 | Lu | H04L 47/76 |
| | | | 709/208 |
| 2014/0233370 A1* | 8/2014 | Khare | H04L 41/0668 |
| | | | 370/219 |
| 2015/0271244 A1* | 9/2015 | Bloch | H04L 69/40 |
| | | | 709/217 |
| 2016/0036643 A1* | 2/2016 | Nair | H04L 41/0895 |
| | | | 370/255 |
| 2016/0050145 A1* | 2/2016 | Tsirkin | H04L 49/9068 |
| | | | 718/105 |
| 2016/0269318 A1* | 9/2016 | Su | H04L 47/785 |
| 2016/0350151 A1* | 12/2016 | Zou | H04L 45/586 |
| 2017/0279690 A1* | 9/2017 | Tripathi | H04L 45/586 |
| 2018/0121226 A1* | 5/2018 | Liu | G06F 11/3419 |
| 2018/0123953 A1* | 5/2018 | Lin | H04L 12/4641 |
| 2018/0302325 A1* | 10/2018 | Qin | H04L 49/70 |
| 2019/0280971 A1* | 9/2019 | Yu | H04L 12/4641 |
| 2019/0356728 A1* | 11/2019 | Devilbiss | H04L 67/1008 |
| 2022/0197683 A1* | 6/2022 | Potlapally | H04L 45/76 |
| 2023/0051825 A1* | 2/2023 | Chang | G06F 3/0635 |
| 2023/0269182 A1* | 8/2023 | Li | H04L 69/163 |
| | | | 370/392 |
| 2024/0126581 A1* | 4/2024 | Nguyen | G06F 9/45558 |
| 2024/0134673 A1* | 4/2024 | Srinivasan | H04L 41/0843 |

* cited by examiner

APPARATUS AND METHOD FOR POOLING NETWORK INTERFACE CARDS IN A CLOUD NETWORK

BACKGROUND OF THE INVENTION

1. Field of the Invention

The present application relates to an apparatus and method that pools network interface cards in a cloud network.

2. Description of the Related Art

FIG. 1 shows a conventional cloud network system. All the hardware servers 101-103 have one or more of their own dedicated network interface cards (NICs) 104-106. A server can have multiple NICs depending on how many slots are available on their motherboard. All data processed by the servers 101-103, both inbound and outbound, are required to go through its corresponding physical NIC. The NICs 104-06 are connected to one or more switches 107. Consequently, all data transfers between the servers 101-103 are made through switch 107.

For example, if the virtual machine 2 (VM2) 109 transfers data to virtual machine 108, it needs to bridge its virtual NIC to physical NIC 2 105 as shown by data path 111. The data is then sent by NIC 2 105 to switch 107 as shown by data path 112. Thereupon, switch 107 sends the data via data path 113 to physical NIC1 104 of server 104. Finally, NIC1 104 transfers the data to the virtual machine 1 (VM1) 108. Likewise, the transfer of data from VM1 108 to VM3 110 follows data paths 115-118. The data is first sent to physical NIC1 104 of server 1 101, then from NIC1 104 to switch 107, then from switch 107 to NIC3 106 of server 3 103, and finally to virtual machine 3 (VM3) 110.

Because data transfers must all pass through the physical NICs, the conventional cloud network system is limited by the throughput of these NICs. Every single virtual machine can only use its local physical NIC to transfer data. It is impossible for a virtual machine to pool or combine physical NICs from different servers.

This limitation imposed by the way in which physical NICs are implemented in cloud network systems is becoming more and more deleterious. The current trend in computing is for higher speed and greater volumes of data transfers, especially for artificial intelligence (AI) applications. The data transfers are typically performed within the cloud network (e.g., between virtual machines). This is referred to as east-west data transfers or internal data transfers. For example, an AI system, such as OpenAI, typically executes billions of bits of data calculations per second for processing in the cloud network. This scale of computation requires thousands of AI semiconductor chips working in conjunction across multiple virtual machines. It imposes huge data transfer loads between the virtual machines and AI chips. The problem is that there's only a limited amount of NICs that can be housed in any given server due to the physical limitation of physical ports that are available on the server's motherboard. This limits how fast and how much data can be achieved in east-west data transfers. In addition, oftentimes not all the NICs of a particular server are being used meanwhile other servers are short of NIC capacity. This results in highly insufficient and inefficient usage of limited and expensive NIC resources.

SUMMARY OF THE INVENTION

The present invention pertains to a network interface component having a CPU and a pool of physical NICs used to provide network interface resources for one or more virtual NICs is disclosed. An operating system of the network interface component creates one or more virtual NICs to facilitate data flows to and from virtual machines running on one or more servers coupled to the network interface component. The operating system dynamically creates and manages as many virtual NICs as is necessary to handle traffic flows to/from one or more virtual machines running on one or more servers coupled to the network interface component. The operating system also directs which of the physical NICs are to be used or shared amongst which of the virtual NICs. Any physical NIC from the pool can be shared by more than one virtual NIC and can also be reassigned to another virtual NIC depending on traffic flows through the cloud computing network.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
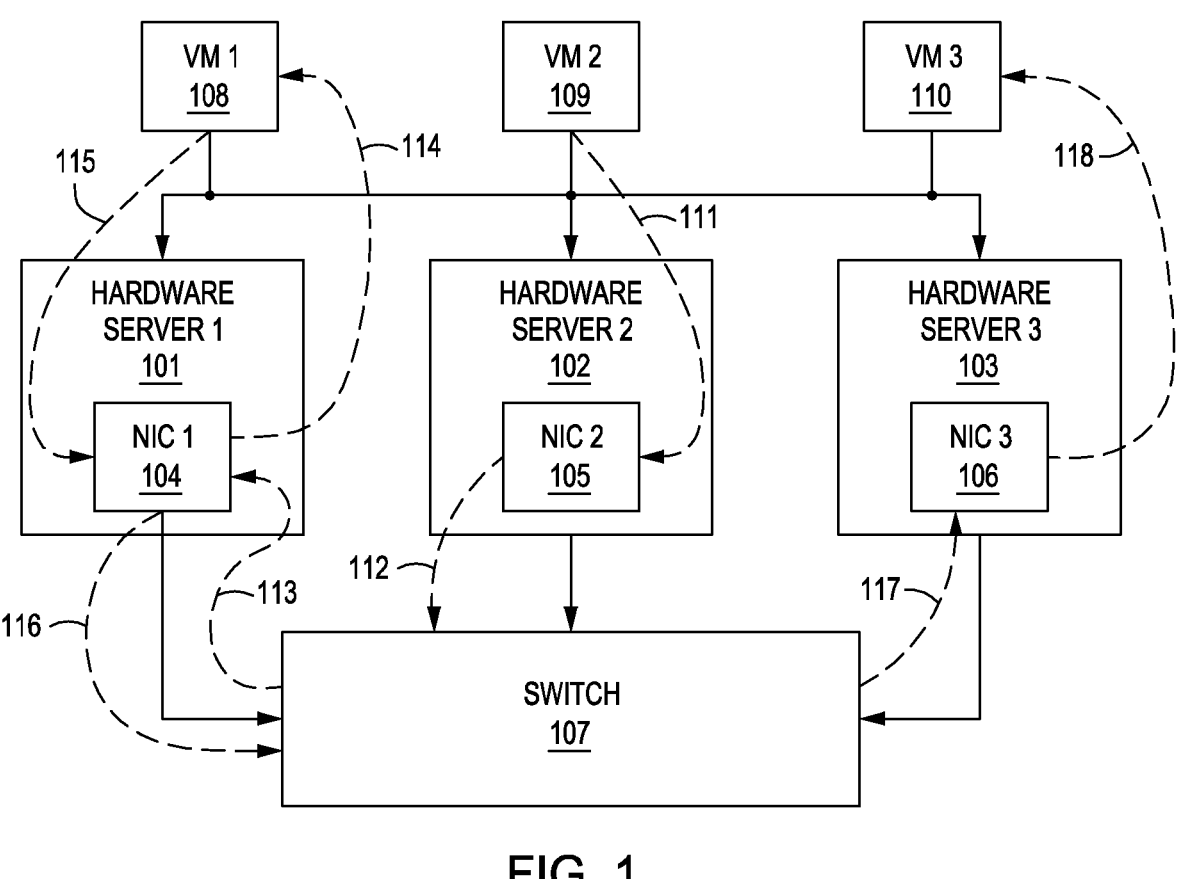
FIG. 1 shows a conventional cloud network system.
Figure 2:
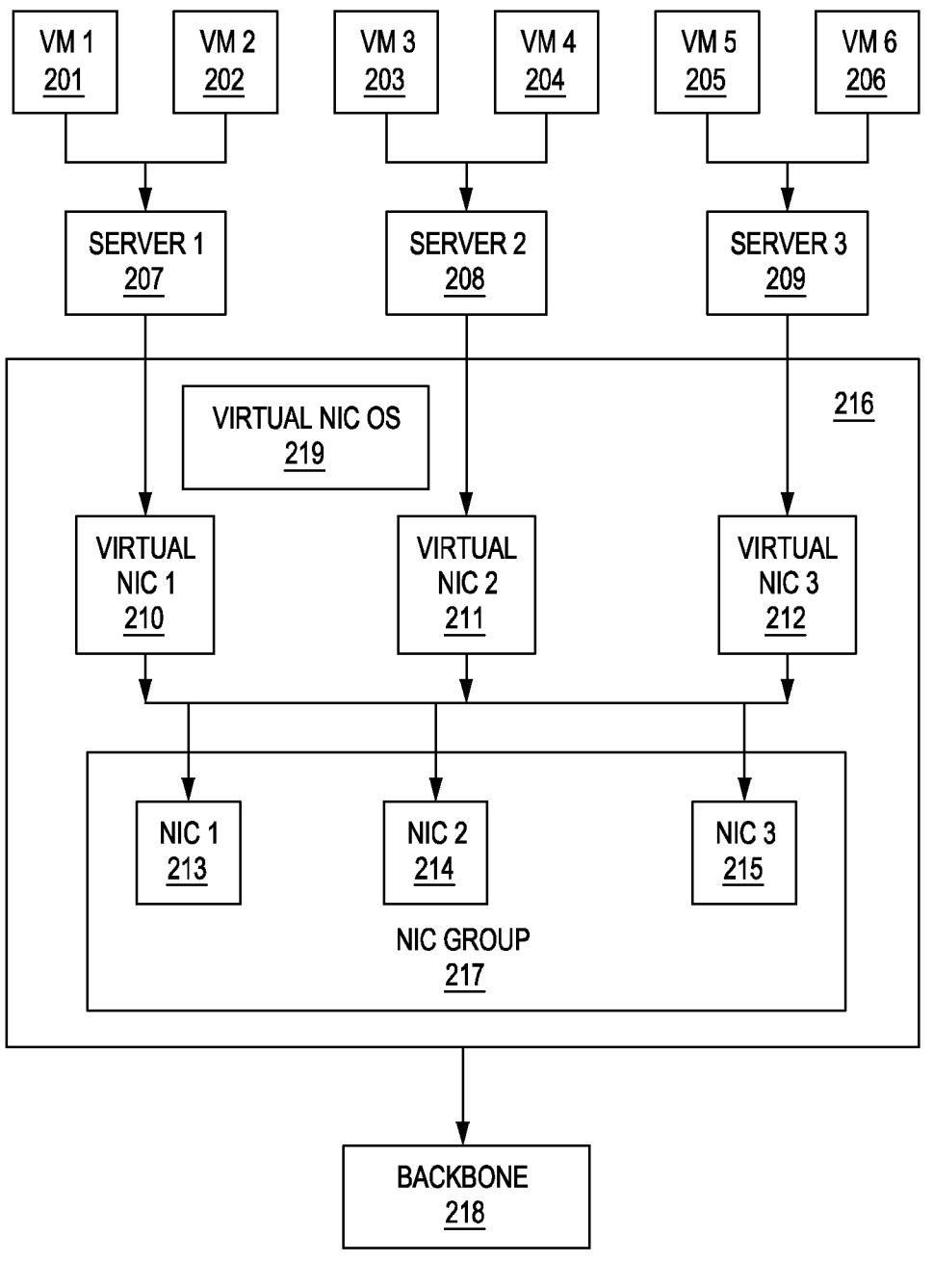
FIG. 2 shows a block diagram that illustrates an example of a cloud computing network with a pooled network interface component in accordance with one embodiment of the present invention.

FIG. 2 shows a block diagram that illustrates an example of a cloud computing network with a pooled network interface component 216 in accordance with one embodiment of the present invention. As described in greater detail below, a virtual circuit in a network device reformats one or more incoming data streams at a non-predetermined data rate into one or more outgoing data streams at a predetermined fixed data rate which, in turn, allows multiple data streams with non-predetermined data rates that are less than the predetermined fixed data rate to be combined and output from a single network port, and a single data stream with a non-predetermined data rate that is greater than the predetermined fixed data rate to be split and output from two or more network ports.

As shown in FIG. 2, a number of virtual machines 201-206 are coupled to servers 207-209. A number of virtual machines can be coupled to any particular server. The servers 207-209 are coupled to a pooled NIC component 216. The servers and their corresponding virtual machines all share the pooled NIC resources available in the pooled NIC component 216. The pooled NIC component 216 includes, but is not limited to, a number of virtual NICs (e.g., virtual NICs 210-212) and a number of physical NICs (e.g., NIC1 213, NIC2 214, and NIC3 215). The physical NICs 213-215 form a NIC group 217. NIC group 217 can have many different physical NICs and more can be added as needed. A virtual NIC operating system software is used to operate the pooled NIC component 216. The pooled NIC component 216 is coupled to the backbone 218 of the internet.

In one embodiment, a group of physical NICs (e.g., NICs 213-215 of NIC group 217) are separate from corresponding servers (e.g., servers 207-209). In other words, these physical NICs do not reside in any server. Instead, they reside within a NIC group 217 of the pooled NIC component 216. It may still be that one or more servers can have its own physical NIC. But the pooled physical NICs of the NIC group are shared amongst the various servers. Consequently, the virtual machines (e.g., VMs 201-206) created in the physical servers (e.g., servers 207-209) can connect to the virtual NICs (e.g., virtual NICs 210-212) within the pooled NIC component 216. In one embodiment, the NIC group 217 is conned to the physical serers through a PCIe cable.

The pooled NIC component 216 has an operating system, Virtual NIC OS 219 that can generate one or more virtual NICs through Network Element Virtualization (NEV) and standard virtual NIC software. The operating system can create and delete virtual NICs dynamically, on an as-needed basis. NEV is the technology for abstracting/virtualizing the underlying network resources. It is congruous to VMware's concept of abstracting and virtualizing x86 server resources. NEV fundamentally allows virtualization of network elements whereby networking elements, cables, routers, switches, gateways, and now NICs can be virtualized. Multiple virtual connections can be transported over the same physical connection while bandwidth and latency can be dynamically adjusted as needed. As a result, a physical network interface can carry many NEV service virtual interfaces. The virtual NIC OS follows PCIe protocol to connect the physical servers. The difference with other virtual NIC is that it should generate multiple virtual NICs to multiple server connections based on PCIe protocol. It is a fully mesh connection. Another aspect is that in one embodiment of the present invention, the virtual NIC is based on NEV technology and can generate unlimited physical-like ports instead of normally virtual NIC's only logical port.

In one embodiment, each virtual NIC supports NEV and can go through NEV to provide unlimited bandwidth port. Each virtual NIC can cross and cover multiple physical NICs through NEV technology. Multiple virtual NICs can be merged to form a higher level virtual NIC. This means that the virtual NIC can have additional layers. Moreover, multiple servers can use one virtual NIC and also one server can use multiple virtual NICs. The virtual machines 201-206 can also direct connect to the virtual NICs 210-212 through a bridge connection.

This system basically is pooling or sharing physical NICs and enables many servers to use unlimited physical NICs and also through virtual NICs to generate customized NICs to each server. Any one or more of the virtual NICs 210-212 also can be migrated to any server if it is currently off loaded. The virtual NIC OS 219 uses PCIe to connect the pooled NIC component 216 to each server 207-209. It follows standard PCIe protocol to register one or more virtual NICs to each server. One virtual NIC will have multiple IDs for each server that can enable each server to determine, for each virtual NIC, whether that virtual NIC is available or not occupied/assigned. The virtual NIC OS 219 also creates one or more virtual NICs based on the physical NIC group 217 resources and use NEV technology to create unlimited NIC port interfaces. Thereby, it achieves the functionality of a physical NIC but without the physical NIC limitations. Depending on the data traffic, the pooling of virtual and physical NICs can be dynamically controlled to handle the increase and/or decrease in data traffic through the network in a more efficient and effective manner. For example, if data traffic corresponding to a particular server increases, the pooled network interface component can assign additional virtual NICs and physical NICs to handle the increased data flow for that server. Likewise, if data flow to/from a particular server decreases, the pooled network interface component can proportionally redirect the virtual and physical NICs from that server to support some other part of the network. The pooling NIC/virtual NIC is not only for VM but also for the physical server. This means that in the physical server, it can also see an elastic/dynamic NIC connect to it. Consequently, any physical server can leverage virtual NICs (in NIC pool) to connect to others and is not limited with local physical NIC(s).

According to the block diagram of FIG. 2, data from VM1 201 of server 1 207 can be sent through the virtual NIC 1 210 and then through a physical NIC1 213 of NIC group 217 to virtual NIC2 211 of server 2 208 and then to virtual machine VM3 203. There is no need to go through a switch or through the backbone. VM1 can transmit data to VM2 through the pooled NIC component 216. Likewise, any of the virtual machines 201-206 can directly transmit and receive data between any of the other virtual machines 201-206 coupled to the pooled NIC component 216 through their respective virtual and physical NICs of the pooled NIC component 216. The virtual NIC OS 219 assigns the virtual and physical NIC resources to efficiently and effectively handle the internal east-west data transfers, all within the cloud computing network. Other advantages include providing alternative compute network interconnection solutions other than InfiniBand or NVLink. Furthermore, support for any-to-any ultra high-speed interconnection by virtualized network port pooling is enabled. A per host 1 Tbps throughput for compute network in data center and cloud environment is achieved. Thereby, the present invention provides features for a low cost, scalable, integrated NEV virtualization product.

Figure 3:
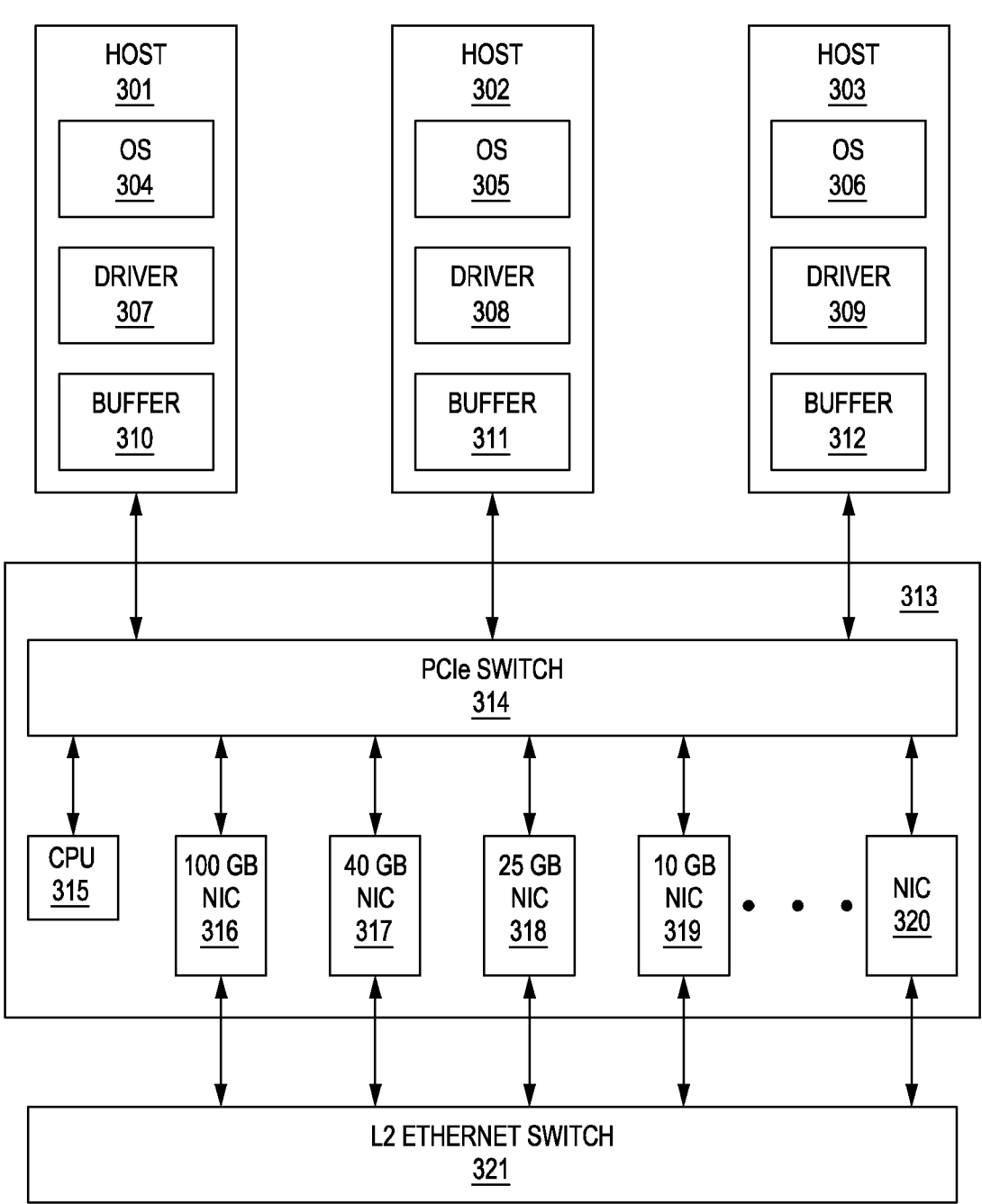
FIG. 3 FIG. 3 shows one embodiment of the pooled network interface component of the present invention.

FIG. 3 shows one embodiment of the pooled network interface component of the present invention. A number of host computers or servers 301-303 are shown. These computers can run a number of virtual machines. The host computers 301-303 include operating systems 304-306, drivers 307-309, and NIC buffers 310-312. The NIC buffers 310-312 are PCIe 6 endpoint devices. They have two PCIe endpoints (EP); one connects to the host and another connects to the NIC point of delivery (POD) appliance 313. Memory (e.g., cache memory) chips within the NIC buffers have read/write speeds of 2 Tbit/sec or greater. The NIC buffers can support up to and beyond 1024 virtual endpoints (vEP), with an aggregate of 1 Tbps support and 1 Tbs throughput. It can manage bandwidth allocation for each virtual endpoint. It is exposed to the operating system as a standard EP/netdev, rather than a NIC. Furthermore, it is exposed to the NIC POD as a storage EP (e.g., DRAM memory). Synchronization for IRQ notification is enabled between the NIC buffers 310-312 and the NIC POD 313.

PCIe bus connects the host computers 301-303 to the NIC POD appliance 313. The NIC POD appliance 313 has a PCIe switch 314, CPU 315, and physical NICs 316-320. It has 16-24Tb capacity with a 1:1 non-block function. The integrated PCIe switch 314 connects the NIC buffers 310-312 to the physical NIC cards 316-320 of NIC POD 313. Sixteen to twenty-four hosts can be connected via the PCIe switch. Read/write data in the NIC buffer function at the speed of the allocated bandwidth for specific virtual endpoints and traffic is distributed across NIC pool by implementing the appropriate algorithm. An L2 Ethernet Switch 321 switches between different hosts 301-303.

Figure 4:
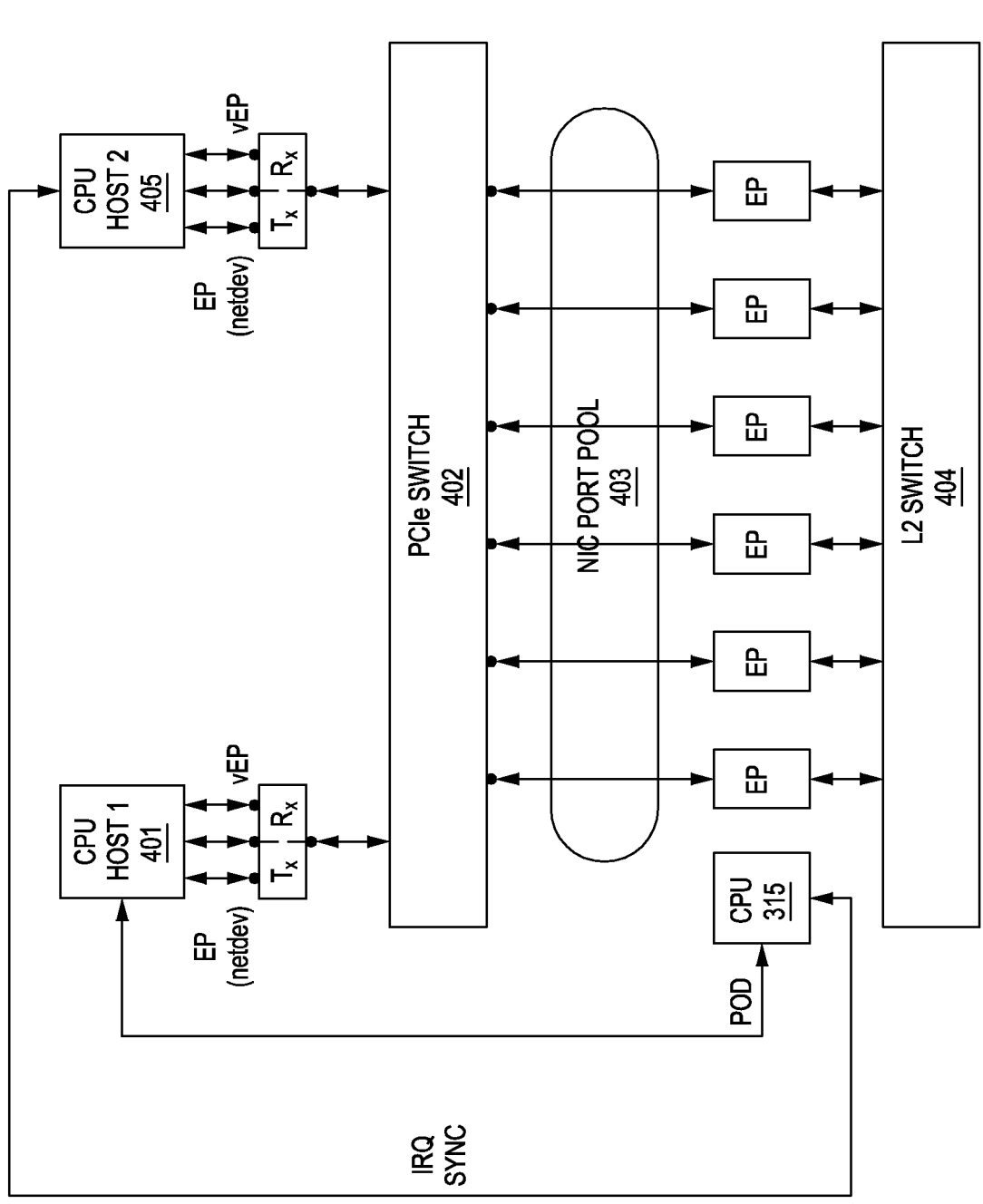
FIG. 4 shows an exemplary data flow diagram according to one embodiment of the present invention.

FIG. 4 shows an exemplary data flow diagram according to one embodiment of the present invention. The Host1 CPU 401 uses a standard Linux protocol stack to process data on the endpoint EP (netdev) with a read/write speed at 1 Tera bits per second (Tbps). Host1 has a 1 Tbps throughput. Host 1 can create up to 1024 or more virtual EPs on the NIC buffer. Each virtual endpoint (vEP) is allocated with specified bandwidth. The buffer is allocated associated with the bandwidth accordingly. The CPU on the Host and POD synchronize the IRQ notification cross device. The POD CPU processes data on the endpoint (EP) (e.g., storage). The POD CPU steers traffic from the vEP on the host via PCIe switch 402 and across the NIC port pool 403. An external L2 switch 404 performs traffic forwarding to the Host2. Host2 CPU 405 uses standard Linux protocol stack to process data on EP (netdev). The data flows between the Host1, EP (storage) and PCIe switch is by PCIe. Likewise, the data from between the Host2, EP (storage), and PCIe switch is by PCIe. The data flows between the PCIe switch, the NIC port pool, and the endpoints (EP) are via PCIe. The data flows between the endpoints (EP) and the L2 switch are via Ethernet.

Figure 5:
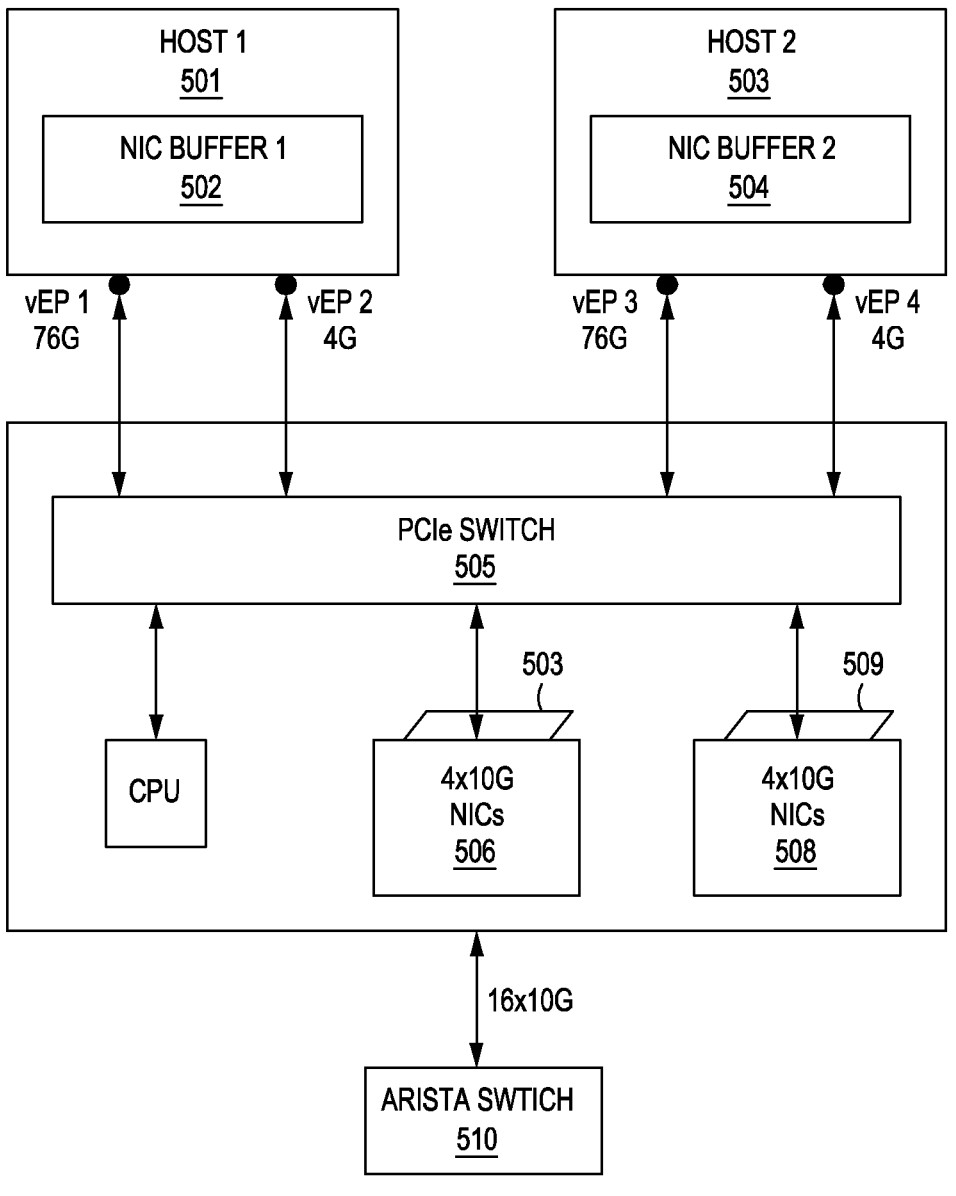
FIG. 5 shows a computer network system according to one exemplary embodiment of the present invention.

FIG. 5 shows a computer network system according to one exemplary embodiment of the present invention. The NIC buffer1 502 is included in an x86 server Host1 501. It has 80 Giga bits per second (GBps) throughput and has one PCIe gold finger connect to the host 1 CPU, and another PCIe cable connect to the POD. Furthermore, it creates two virtual EPs: the vEP1 has a bandwidth of 76 Bbps and vEP2 has a bandwidth of 4 Gbps for a total of 80 Gbps. The NIC buffer2 504 also runs on an x86 server Host2 503. It has an 80 Gbps throughput. It has one PCIe gold finger connect to host 2 CPU, another PCIe cable connect to the NIC PD. It creates two virtual EP: vEP3 has a bandwidth of 76 Gbps and vEP2 has a bandwidth of 4 Gbps, for a total of 80 Gbps. The NIC POD has 160 Gbps throughput. It has a PCIE switch 505 to connect the POD CPU, NIC Buffer1, NIC Buffer2 and four 4×10G standard conventional NICs 506-509. The four 4×10G conventional NICs connect to an external switch 510 (e.g., an Arista switch). The traffic flow from vEP1 on Host1 to vEP3 on Host2, iPerf send/receive is 76 Bps. The traffic flow from vEP4 to vEP1 on Host1, iPerf send/receive is 4 Gbps. And because the present invention can pool all NICs, the network can leverage NEV NIC to create customized NIC for each host and not only just provide standard NIC, for example 10G, 200G (e.g., aggregate two 100G NIC). Instead, with the present invention, 123G NIC can be implemented through a 100G standard NIC and a 23G NEV NIC.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims. Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

Some portions of the detailed descriptions are presented in terms of procedures, logic blocks, processing, and other symbolic representations of operations on data bits within a computer memory. These descriptions and representations are used by those skilled in the data processing arts to effectively convey the substance of their work to others skilled in the art. In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor. The computing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the method of the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A network device, comprising:

a network interface component comprising:

a first plurality of physical ports that couple a plurality of servers to the network interface component, wherein virtual machines running on the plurality of servers coupled to the network interface component are configured to transmit and receive data to and from the first plurality of physical ports;

a plurality of virtual network interface cards running within the network interface component that have logical ports that are coupled to the virtual machines running on the plurality of servers, wherein a single one of the virtual machines running on one of the plurality of servers is configured to use one or more of the plurality of virtual network interface cards, and wherein one of the plurality of virtual network interface cards is configured to be used by one or more of the virtual machines running on one of the plurality of servers;

a plurality of physical network interface cards that provide physical resources for creating and support-ing functions of the plurality of virtual network interface cards, wherein one of the plurality of virtual network interface cards is configured to access func-tions of one or more of the plurality of physical network interface cards; and a second plurality of physical ports that couple the network interface component to a switch; and a processor that has an operating system configured to generate one or more of the plurality of virtual network interface cards to facilitate data flows to and from the virtual machines, wherein the operating system dynamically creates and manages as many of the plurality of virtual network interface cards as is necessary to handle increases and decreases in traffic flows to and from one or more of the virtual machines and also directs which of the plurality of physical network interface cards are to be used or shared amongst which of the plurality of virtual network interface cards and wherein any of the plurality of physical network interface cards can be shared by more than one of the plurality of virtual network interface cards and can also be dynamically reassigned to another virtual network interface card of the plurality of virtual network interface cards depending on live traffic flows through a cloud computing network.

2. The network device of claim 1, wherein each of the plurality of physical network interface cards resides outside of the plurality of servers.

3. The network device of claim 1, wherein each of the first plurality of physical ports of the network interface component is coupled to the plurality of servers through a Periph-eral Component Interconnect express (PCIe) cable.

4. The network device of claim 1, wherein the operating system is further configured to generate one or more virtual network interface cards on an as needed basis based on network element virtualization and standard virtual network interface card (NIC) software.

5. The network device of claim 1, wherein the plurality of virtual network interface cards is coupled to the plurality of servers through Peripheral Component Interconnect express (PCIe) protocol.

6. The network device of claim 1, wherein the plurality of physical network interface cards acts as a pool of network interface resources configured to be shared between the plurality of virtual network interface cards.

7. The network device of claim 6, wherein a physical network interface card is configured to be assigned by the operating system to support the one of the plurality of virtual network interface cards and then reassigned by the operating system to support a different one of the plurality of virtual network interface cards.

8. The network device of claim 6, wherein a physical network interface card is configured to be assigned by the operating system to support multiple virtual network inter-face cards.

9. The network device of claim 1, wherein the plurality of virtual network interface cards is merged to form a higher level virtual network interface card.

10. The network device of claim 1, wherein one of the plurality of servers is configured to use the plurality of virtual network interface cards.

11. The network device of claim 1, wherein the plurality of virtual network interface cards and the plurality of physical network interface cards are configured to be assigned and reassigned between the plurality of servers depending on traffic flows through the cloud computing network.

12. The network device of claim 11, wherein a portion of a virtual network interface card is assigned to a second server from the plurality of servers which needs additional bandwidth more than that of a first server from the plurality of servers.

13. The network device of claim 1, wherein the virtual machines running on of the plurality of servers are config-ured to transmit and receive data to and from each other through the network interface component without going through a switch.

14. The network device of claim 1, wherein the network interface component enables the plurality of servers to use multiple pooled physical network interface cards (NICs).

15. The network device of claim 1, wherein the network interface component is configured to customize the plurality of virtual network interface cards for each of the plurality of servers.

16. The network device of claim 1, wherein one of the virtual machines is coupled to one of the plurality of virtual network interface cards through a bridge and east-west data flows between the plurality of servers goes through the network interface component without going through a sepa-rate external switch.

17. A network comprising:

a plurality of servers running virtual machines processing data and configured to transmit and receive data to and from a first plurality of physical ports;

a network interface device comprising the first plurality of physical ports coupled to the plurality of servers, wherein the network interface device comprises a plurality of virtual network interface cards (NICs) and a plurality of physical NICs, wherein the plurality of virtual NICs have logical ports that are coupled to the virtual machines, wherein a single one of the virtual machines is configured to use one or more of the plurality of virtual NICs, and wherein one of the plurality of virtual NICs is configured to be used by one or more of the virtual machines, wherein the plurality of physical NICs are provisioned to support the plurality of virtual NICs, and wherein the plurality of physical NICs provide physical resources for creating and supporting functions of the plurality of virtual NICs, wherein one of the plurality of virtual NICs is configured to access functions of one or more of the plurality of physical NICs; and a switch coupled to the plurality of physical NICs through a second plurality of physical ports of the network interface device, wherein the switch switches data traffic to and from the plurality of servers; and a processor of the network interface device that has an operating system configured to generate one or more of the plurality of virtual NICs to facilitate data flows to and from the virtual machines, wherein the operating system dynamically creates and manages as many of the virtual NICs as is necessary to handle increases and decreases in traffic flows to and from one or more of the virtual machines and also directs which of the plurality of physical NICs are to be used or shared amongst which of the plurality of virtual NICs and wherein any of the plurality of physical NICs can be shared by more than one of the plurality of virtual NICs and can also be dynamically reassigned to another virtual NIC of the plurality of virtual NICs depending on live traffic flows through the network.

18. The network of claim 17, wherein the plurality of virtual NICs and the plurality of physical NICs provide a pool of virtual endpoints configured to be shared between the plurality of servers.

19. The network of claim 18, wherein the pool of virtual endpoints comprises up to 1024 virtual endpoints.

20. The network of claim 17, wherein the network interface device provides a pool of network interface resources configured to be assigned and re-assigned amongst the plurality of servers depending on data traffic flows corresponding the plurality of servers.

21. The network of claim 17, wherein east-west data flows between the plurality of servers pass directly through the network interface device.

* * * * *